Aug. 2, 1955     D. H. PEDERSEN     2,714,408
SCROLL CUTTING TOOL
Filed Dec. 28, 1953
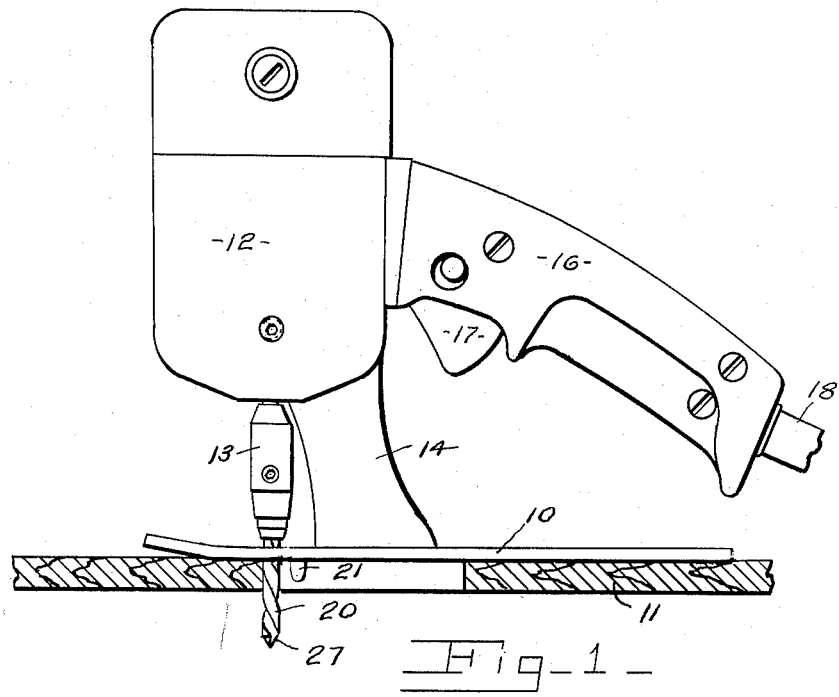
Fig_1_
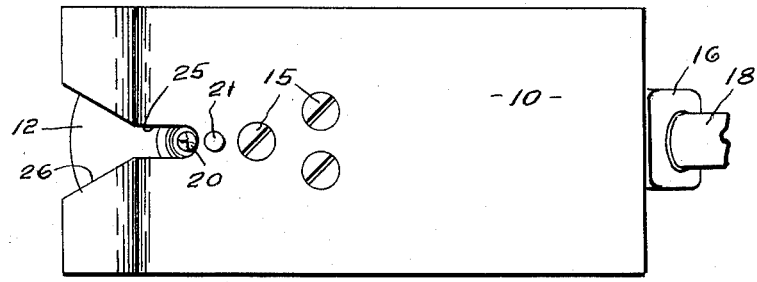
Fig_2_
INVENTOR.
Dane H. Pedersen
BY
D. Emmett Thompson
ATTORNEY.

United States Patent Office 2,714,408
Patented Aug. 2, 1955

2,714,408

SCROLL CUTTING TOOL

Dane Harald Pedersen, Camillus, N. Y., assignor to The Porter-Cable Machine Company, Syracuse, N. Y., a corporation of New York Application December 28, 1953, Serial No. 400,410

4 Claims. (Cl. 144—134)

This invention relates generally to hand manipulated, power operated, cutting tools of the type employed in cutting curves or scrolls. At the present time, such tools employ a reciprocating cutter of the sabre saw type which is difficult to start in a work piece without first providing a starting hole or aperture. The saw blade will not function unless it cuts all the way through the thickness of the work piece. Also, if the tool and saw are turned quickly in the kerf, the blade will break or become clamped and stall the driving motor.

This invention has as an object a hand manipulated power operated cutting tool employing a rotary cylindrical type cutter of relatively small diameter which will penetrate the work drill fashion without the necessity of first providing any starting hole, and which can be easily guided in any direction about short radii without any clamping or binding of the tool in the work.

The invention has as a further object a scroll cutting tool embodying a compact structure of light weight which is economical to manufacture, the tool being provided with means functioning to effect convenient guiding of the tool during its cutting operation.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a side elevational view of a scroll cutting tool embodying my invention.

Figure 2 is a bottom plan view.

The cutter consists of a base plate 10 adapted to be moved along the top surface of a board, or other work piece, indicated at 11, Figure 1. A housing 12 is mounted upon the base plate and contains an electric motor operatively connected to a cutter holding chuck 13 and functions to effect rotation of the chuck at high speed about a vertical axis. The housing 12 is supported by a pedestal 14 detachably secured to the base, as by screws 15. The pedestal 14 is preferably positioned toward one end of the base plate, designated as the forward end of the plate, and the housing 12 is provided with a rearwardly extending handle portion 16 containing a trigger switch 17 for connecting the power lead 18 to the motor windings.

A rotatable cylindrical cutter 20 is carried by the chuck 13 and extends downwardly a distance through the base plate 10. A guide pin 21 is carried by the base plate and depends downwardly therefrom in close proximity to the cutter 20. This guide pin serves to restrain the machine from moving laterally, which it tends to do, because of the action of the rotating cutter. The diameter of the pin is equal to, or slightly less than, the diameter of the cutter and, because of its close proximity to the cutter, does not interfere with the intentional guidance of the cutter to the right or left during the cutting operation, but serves as a steadying guide to permit the machine to be readily guided straight ahead in making straight cuts.

The base plate may be apertured to receive the cutter 20 but preferably the plate is notched inwardly from the forward end, the inner portion 25 of the notch being slightly wider than the diameter of the cutter 20 and the sides of the notch at the outer portion thereof diverging, as at 26. This arrangement permits the operator to clearly view a line scribed on the work. The end of the cutter 20 may be pointed, or otherwise formed, as at 27, to permit the cutter to be inserted vertically into and through the work piece, thereby permitting use of the tool without first forming any starting hole.

The tool is substantially free from vibration, convenient to guide in straight and curved cuts, and can be used for making cuts which do not extend through the thickness of the work by adjusting the cutter in the chuck to extend through the base plate the required distance.

What I claim is:

1. A hand manipulated, power operated, scroll cutting tool comprising a base plate adapted to be positioned on the work piece, a housing mounted on the plate, a spindle journalled vertically in the housing and having a cutter chuck, a cutter carried by said chuck and extending downwardly through the plate, and a guide pin depending from the under side of said plate and arranged in proximity to the cutter.

2. A hand manipulated, power operated, scroll cutting tool comprising a base plate adapted to be moved along the surface of a work piece, a housing mounted on the base plate, a motor mounted in the housing and being operatively connected to a cutter chuck for effecting rotation of the same about a vertical axis, said plate being formed with a notch extending inwardly from one end thereof, a cutter carried by said chuck and extending downwardly through the notch in the base plate, a guide pin projecting from the under side of said base plate in proximity to the cutter.

3. A scroll cutting tool as defined in claim 1, wherein the diameter of the guide pin does not exceed the diameter of the cutter.

4. A bodily, hand-manipulated, power-operated scroll cutting tool comprising a base plate adapted to be positioned and guided on the work piece, a housing mounted on the plate, a power-operated spindle journalled vertically in the housing and having a cutter chuck, a cutter carried by said chuck and extending downwardly through the plate, a guide pin depending from the under side of said plate and arranged in close proximity to said cutter, said guide pin being of cylindrical form and of diameter comparable to that of the cutter.

References Cited in the file of this patent

UNITED STATES PATENTS

| 1,532,683 | Carter | Apr. 7, 1925 |
| 2,238,304 | Belanger | Apr. 15, 1941 |
| 2,591,002 | Pedron | Apr. 1, 1952 |
| 2,630,151 | Turnbull | Mar. 3, 1953 |
| 2,630,152 | Turnbull | Mar. 3, 1953 |
| 2,672,898 | Schuster | Mar. 23, 1954 |